US010705182B2

(12) United States Patent
Win et al.

(10) Patent No.: US 10,705,182 B2
(45) Date of Patent: Jul. 7, 2020

(54) WIDEBAND RANGING SYSTEM

(71) Applicant: Massachusetts Institute of Technology, Cambridge, MA (US)

(72) Inventors: Moe Z. Win, Framingham, MA (US); Stefania Bartoletti, Cambridge, MA (US); Wenhan Dai, Cambridge, MA (US); Andrea Conti, Bologna (IT)

(73) Assignee: Massachusetts Institute of Technology, Cambridge, MA (US)

( * ) Notice: Subject to any disclaimer, the term of this patent is extended or adjusted under 35 U.S.C. 154(b) by 139 days.

(21) Appl. No.: 15/627,822

(22) Filed: Jun. 20, 2017

(65) Prior Publication Data
US 2018/0356494 A1 Dec. 13, 2018

Related U.S. Application Data

(60) Provisional application No. 62/518,840, filed on Jun. 13, 2017.

(51) Int. Cl.
| | | |
|---|---|---|
| *G01S 7/02* | (2006.01) | |
| *G01S 11/06* | (2006.01) | |
| *G01S 7/292* | (2006.01) | |
| *G01S 13/00* | (2006.01) | |

(52) U.S. Cl.
CPC .......... *G01S 7/021* (2013.01); *G01S 7/2923* (2013.01); *G01S 11/06* (2013.01)

(58) Field of Classification Search
CPC ........ G01S 7/021; G01S 11/02; G01S 7/2923; G01S 13/24; G01S 13/325; G01S 13/282; G01S 11/04; G01S 15/104; G01S 11/06; H03D 3/04

See application file for complete search history.

(56) References Cited

U.S. PATENT DOCUMENTS

| 3,216,013 A | * | 11/1965 | Thor | G01S 13/282 |
| | | | | 342/132 |
| 4,285,048 A | * | 8/1981 | Casasent | G01S 13/325 |
| | | | | 342/378 |

(Continued)

FOREIGN PATENT DOCUMENTS

EP 0926510 A1 * 6/1999 ............. G01S 11/02

OTHER PUBLICATIONS

Bartoletti, Stefania, Wenhan Dai, Andrea Conti, and Moe Z. Win. "A mathematical model for wideband ranging." IEEE Journal of Selected Topics in Signal Processing 9, No. 2 (2015): 216-228.

(Continued)

*Primary Examiner* — Bernarr E Gregory
(74) *Attorney, Agent, or Firm* — Occhiuti & Rohlicek LLP

(57) ABSTRACT

A ranging system includes an input for receiving a wireless signal and a detector for determining an estimate of a time-of-arrival of the wireless signal at the ranging system. The detector includes a first module for processing the wireless signal according to a non-linear, monotonic transformation to generate a modified signal, a second module for compressing the modified signal according to a linear transformation, resulting in a compressed signal including a number of elements, each element corresponding to a different time segment of the modified signal, and a third module for applying a decision function for determining an output including a first element of the number of elements, corresponding to the time-of-arrival of the wireless signal at the ranging system, applying the decision function, including comparing the elements of the compressed signal to corresponding thresholds of a number of thresholds associated with the number of elements.

33 Claims, 6 Drawing Sheets

(56) References Cited

U.S. PATENT DOCUMENTS

| | | | | |
|---|---|---|---|---|
| 4,734,702 | A | * | 3/1988 | Kaplan .................. G01S 11/04 342/424 |
| 5,077,702 | A | * | 12/1991 | Whyland .............. G01S 15/104 367/100 |
| 5,329,242 | A | * | 7/1994 | Myers ...................... H03D 3/04 329/300 |
| 5,519,399 | A | * | 5/1996 | Greene .................. G01S 7/021 324/76.24 |
| 6,888,492 | B1 | * | 5/2005 | Voles ...................... G01S 13/24 342/90 |
| 8,565,690 | B2 | | 10/2013 | Suwansantisuk et al. |
| 2013/0176174 | A1 | | 7/2013 | Annavajjala |
| 2018/0267157 | A1 | * | 9/2018 | Guruprasad ............ G01S 11/02 |

OTHER PUBLICATIONS

Cheng, X., Frederik Vanhaverbeke, Y. L. Guan, and Marc Moeneclaey. "Blind combining for weighted energy detection of UWB signals." Electronics letters 47, No. 1 (2011): 55-57.

Dardari, Davide, Chia-Chin Chong, and Moe Win. "Threshold-based time-of-arrival estimators in UWB dense multipath channels." IEEE Transactions on Communications 56, No. 8 (2008).

Dardari, Davide, Andrea Conti, Ulric Ferner, Andrea Giorgetti, and Moe Z. Win, "Ranging with ultrawide bandwidth signals in multipath environments." Proceedings of the IEEE 97, No. 2 (2009): 404-426.

Giorgetti, Andrea, and Marco Chiani. "Time-of-arrival estimation based on information theoretic criteria." IEEE Transactions on Signal Processing 61, No. 8 (2013): 1869-1879.

Kalamkar, Sanket S., and Adrish Banerjee. "On the performance of generalized energy detector under noise uncertainty in cognitive radio." In Communications (NCC), 2013 National Conference on, pp. 1-5, IEEE, 2013.

Mariani, Andrea, Andrea Giorgetti, and Marco Chiani. "Wideband spectrum sensing by model order selection." IEEE Transactions on Wireless Communications 14, No. 12 (2015): 6710-6721.

Song, Jian, Z. Feng, P. Zhang, and Z. Liu. "Spectrum sensing in cognitive radios based on enhanced energy detector." IET communications 6, No. 8 (2012): 805-809.

Xu, Chi, and Choi L. Law. "Delay-dependent threshold selection for UWB TOA estimation." IEEE communications letters 12, No. 5 (2008): 380-382.

* cited by examiner

WIDEBAND RANGING SYSTEM

CROSS-REFERENCE TO RELATED APPLICATIONS

This application claims priority to to U.S. Provisional Application No. 62/518,840 filed Jun. 13, 2017, which is incorporated herein by reference.

STATEMENT AS TO FEDERALLY SPONSORED RESEARCH

This invention was made with government support under N00014-11-10397 awarded by the Office of Naval Research. The government has certain rights in the invention.

BACKGROUND

This invention relates to a wideband ranging system.

Many applications in signal processing require searching for a signal in a received waveform. For example, in network localization and radar applications, the detection and arrival time estimation of a probe signal that propagates from a wireless source through the wireless medium is crucial to estimate the range between a receiver and a target object. In this case, the range is determined by searching for the transmitted signal in the received signal. The time-of-arrival is determined from the first received signal sample that contains the transmitted signal modified by the wireless channel.

Some approaches to ranging using time-of-arrival (TOA) apply a fixed threshold to energy of a received signal in various time bins. However, because of propagation characteristics (e.g., an environment-dependent propagation power exponent) in cluttered and multipath environments, use of a fixed threshold or use of energy as the quantity for detection may not provide adequate ranging performance.

SUMMARY

In a general aspect, a ranging system includes an input for receiving a wireless signal and a detector for determining an estimate of a time-of-arrival of the wireless signal at the ranging system. The detector includes a first module for processing the wireless signal according to a non-linear, monotonic transformation to generate a modified signal, a second module for compressing the modified signal according to a linear transformation, resulting in a compressed signal including a number of elements, each element corresponding to a different time segment of the modified signal, and a third module for applying a decision function for determining an output including a first element of the number of elements, corresponding to the time-of-arrival of the wireless signal at the ranging system, applying the decision function, including comparing the elements of the compressed signal to corresponding thresholds of a number of thresholds associated with the number of elements.

Aspects may include one or more of the following features.

The first module, the second module, and the third module may be configured to operate according to a set of parameters. The non-linear, monotonic transformation may include a power function and the set of parameters may include a first parameter associated with an exponent of the power function. The linear transformation may be associated with an M×N element compression matrix, where N is a number of elements in the compressed signal. The set of parameters may include a parameter associated with N. The set of parameters may include a number of weighting parameters, each weighting parameter associated with an element of the M×N element compression matrix. The set of parameters may include a number of threshold parameters, each threshold parameter associated with a corresponding threshold of the number of thresholds.

The ranging system may include a fourth module for determining the set of parameters. The determining the set of parameters may include for each hypothesis of a number of hypotheses, determining a hypothesized input signal for the hypothesis according to an environment model, processing the hypothesized input signal using the first module configured according to the set of parameters, the second module configured according the set of parameters, and the third module configured according to the set of parameters to determine the output of the ranging system for the hypothesis, and determining an overall performance metric for the ranging system, configured according to the set of parameters, based on the number of hypotheses and the outputs of the ranging system corresponding to the number of hypotheses. The set of parameters may be updated based on the performance metric.

Each hypothesis of the number of hypotheses may correspond to a possible time-of-arrival of the wireless signal at the ranging system. The environment model may include a predetermined mapping between a number of hypotheses and a corresponding number of hypothesized input signals in an environment similar to an environment in which the ranging system operates. The set of parameters may be determined iteratively.

Determining the performance metric may include averaging a number of local performance metrics, each local performance metric determined from a hypothesis of the number of hypothesis and its corresponding ranging system output. The local performance metric may be based on a range error between the hypothesis and its corresponding ranging system output. Applying the decision function may include identifying an element with a maximum value from the number of elements of the compressed signal. The non-linear, monotonic transformation may include a non-linear, non-square law monotonic transformation. Comparing the elements of the compressed signal to corresponding thresholds of the number of thresholds associated with the number of elements may include identifying an earliest element of the number of elements of the compressed signal that exceeds the threshold corresponding to the element.

In another general aspect, a method for configuring a ranging system includes choosing a set of hypotheses, each hypothesis of the number of hypotheses being associated with a different time-of-arrival of a wireless signal at the ranging system, choosing a model of the environment in which the ranging system is deployed, configuring the ranging system according to a non-linear monotonic function, the non-linear monotonic function being parameterized by a first set of one or more parameters, configuring the ranging system according to a linear compression function, the linear compression function being parameterized by a second set of one or more parameters, configuring the ranging system according to a decision function, the decision function being parameterized by a third set of one or more parameters, updating the first set of one or more parameters, the second set of one or more parameters, and the third set of one or more parameters according to a metric associated with an estimated performance of the ranging system in the environment, over the set of hypotheses, when configured according to the first set of one or more parameters, the second set of one or more parameters, and the third set of one or more parameters.

Aspects may include one or more of the following features.

The non-linear, monotonic transformation may include a non-linear, non-square law monotonic transformation. The non-linear, monotonic transformation may include a power function and the set of parameters includes a first parameter associated with an exponent of the power function. The linear transformation may include an M×N element compression matrix, where N is a number of elements in a compressed signal output by the linear compression function, and the set of parameters includes a parameter associated with N and a number of weighting parameters, each weighting parameter associated with an element of the M×N element compression matrix.

The decision function may be configured to apply a number of thresholds to elements of a compressed signal and the set of parameters may include a number of threshold parameters, each threshold parameter associated with a corresponding threshold of the number of thresholds.

The performance of signal search depends on intrinsic properties of the signal, the operating environment, and the processing resources. For example, the presence of obstructions and clutter heavily attenuates the signal, lowers the signal-to-noise ratio and/or leads to multipath and excess delays in wireless signal propagation. To mitigate these effects, the system can adapt its parameter setting to environment variations. Performance can benefit from adaptive or particularly configured systems that rely on any prior knowledge or on the periodic learning from measurements in the operating environment. For wideband ranging, the search operation can adapt to the channel state information (e.g., known or estimated) to seek the modified version of the transmitted signal due to the wireless propagation (e.g., matched filter). However, such adaptive processing increases the computational complexity. The amount of resources allocated for signal processing is usually chosen based on the accuracy-complexity trade-off. A system for signal search processes the received samples through a non-linear receiver and makes a decision based on a decision rule. The decision rule is designed to achieve a performance goal in terms of detection rate or false-alarm rate.

For example, a square-law device and a simple threshold comparison can be used for signal search in wireless environments. In other examples, an energy detector or an enhanced version is adopted for wideband ranging. In this case, the search is performed within a vector of energy samples instead of the signal samples, where each energy sample is obtained by summing up a set of squared signal samples. This decreases the computational complexity of the system compared to the simple square-law device followed by the threshold comparison because the size of the decision vector is smaller. However, an accuracy loss is experienced as well. For example, if the wideband ranging is performed via time-of-arrival (TOA) estimation based on energy detection, each energy sample is obtained from a sample set that spans a time interval that is larger than the sampling time. This decreases the time resolution of TOA estimation.

A general scheme can be defined for an adaptive system that searches for a signal based on compressed data. The sections of the scheme are designed by solving an optimization problem, whose objective function (i) is adaptive according to the variability of the operating environment and (ii) has low-complexity computation.

To this aim, a computational technique is used in which a decision vector is obtained from the received sample vector through a non-linear transformation followed by a linear compression. Then, the search is performed by selecting an element of the vector through a decision rule. The framework enables both the system design and performance analysis. The system design is divided in three different parts corresponding to the three sections of the scheme: (i) non-linear transformation; (ii) linear compression; and (iii) decision rule.

The non-linear transformation improves the performance under different operating conditions. For example, in the generalized energy detection the sample vector is processed by a power operation other than the square-law. It has been shown that different power operations lead to different performance depending on the noise uncertainty.

The linear compression is sometimes used to reduce the search computational complexity. In general, the compression function can be different from a simple average or sum of the samples within super-samples of fixed length. In fact, such a function can be a general linear function that transforms the vector of received signal samples into a shorter vector. The linear function can be chosen to optimize an objective function related to accuracy constraints by taking into account any prior knowledge or learned information about the operating environment (e.g., if some values of range are more likely to occur than others, each energy sample can be calculated from sets of samples with a different size to adapt to this prior knowledge).

If the non-linear transformation is a monotonic function, the probability distribution functions of the variables at the output of the linear compression operation can be derived from the probability distribution functions of the variables at the input of the linear compression operation.

The decision rule is designed by defining an objective function related to a performance metric. The performance metric can be written in terms of probability of selecting each element of the decision vector, i.e. the probability mass function of selecting the $i^{th}$ element.

The proposed scheme has three main advantages: (i) the generality with respect to the domain of the measured variables (e.g., frequency, time, and space); (ii) the adaptability to the operating environment (e.g., through the use of channel state information or equivalent information); and (iii) the low-complexity decision with respect to classical methods.

Other features and advantages of the invention are apparent from the following description, and from the claims.

DESCRIPTION

Figure 1:
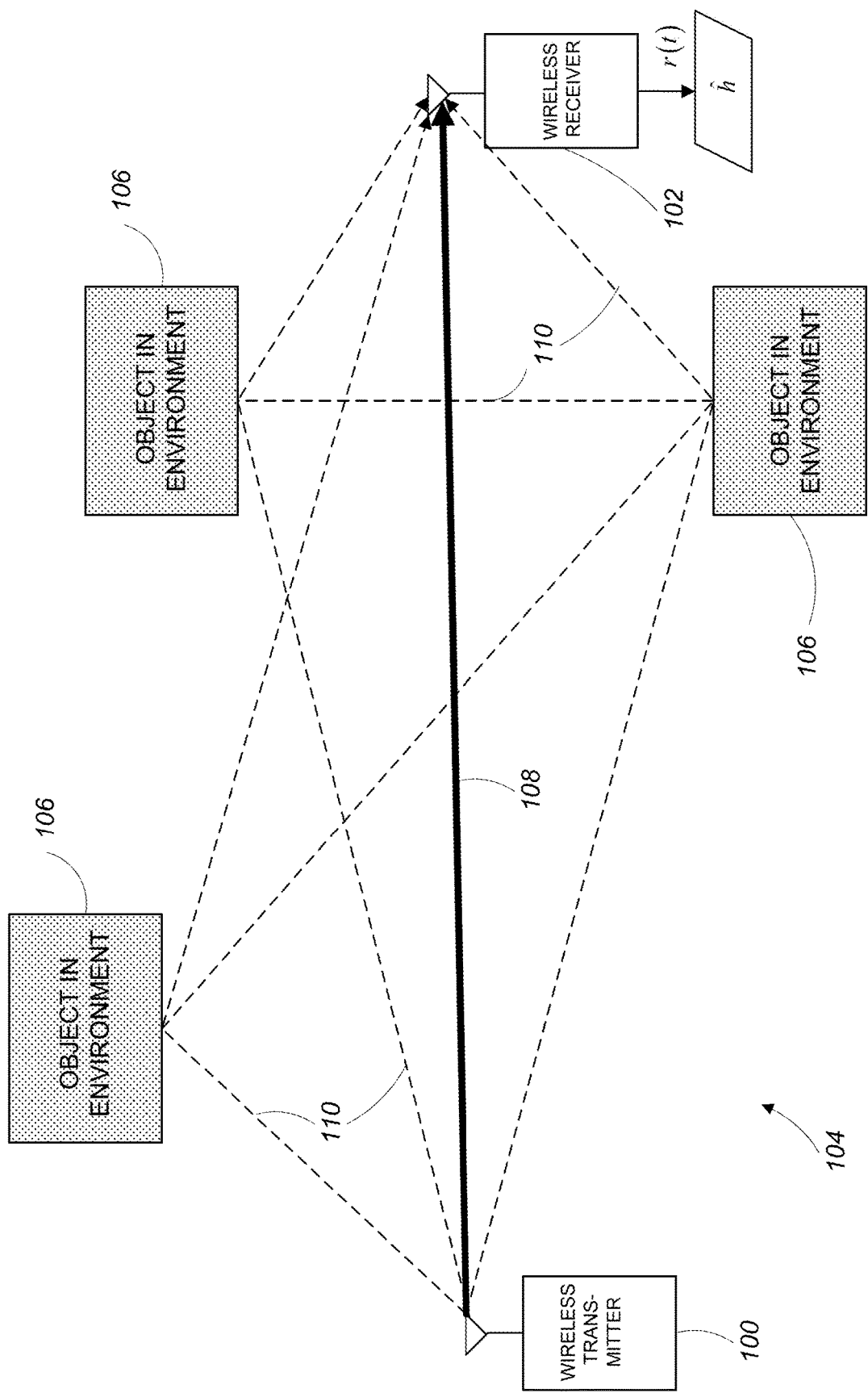
FIG. 1 is a ranging system deployed in an environment.

Referring to FIG. 1, which provides a schematic view, a wireless transmitter 100 and a wireless receiver 102 are located in an environment 104. The environment 104 includes a number of objects 106 (e.g., pillars, furniture, people, etc.). When the wireless transmitter 100 transmits a wireless signal in the environment 104, the wireless signal travels between the wireless transmitter 100 and the wireless receiver 102 along a direct path 108 and along a number of indirect paths 110 which include reflections of the signal off of one or more of the objects 106. The wireless signals from both the direct path 108 and from the indirect paths 110 combine at the wireless receiver 102 to form a received signal, r(t).

Figure 2:
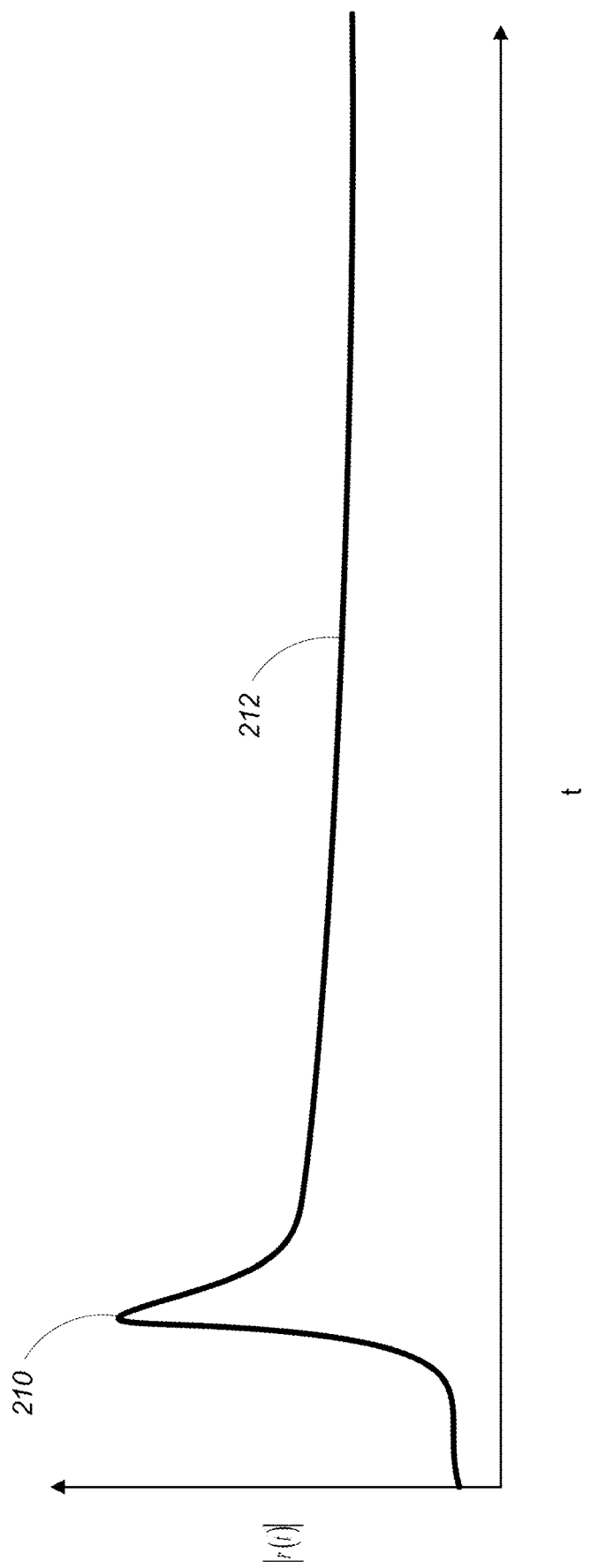
FIG. 2 is an absolute value of a received signal.

In FIG. 2, one example of a received signal (plotted in absolute value), r(t) includes a peak 210 associated with the direct path 108 and a tail portion 212 associated with the indirect paths 110.

The wireless receiver 102 processes the received signal, r(t) to determine an estimate of a time of arrival $\hat{h}$ of the direct path 108 of the transmitted signal from the received signal, r(t).

Very generally, the wireless receiver 102 determines $\hat{h}$ based on processing r(t) by applying a non-linear function and dividing the processed signal into time windows through a linear compression function to generate a decision vector. Each element of the decision vector corresponds to a time window, with a duration corresponding to the resolution of the time-of-arrival estimation. A decision function is applied to the decision vector to determine h.

Figure 3:
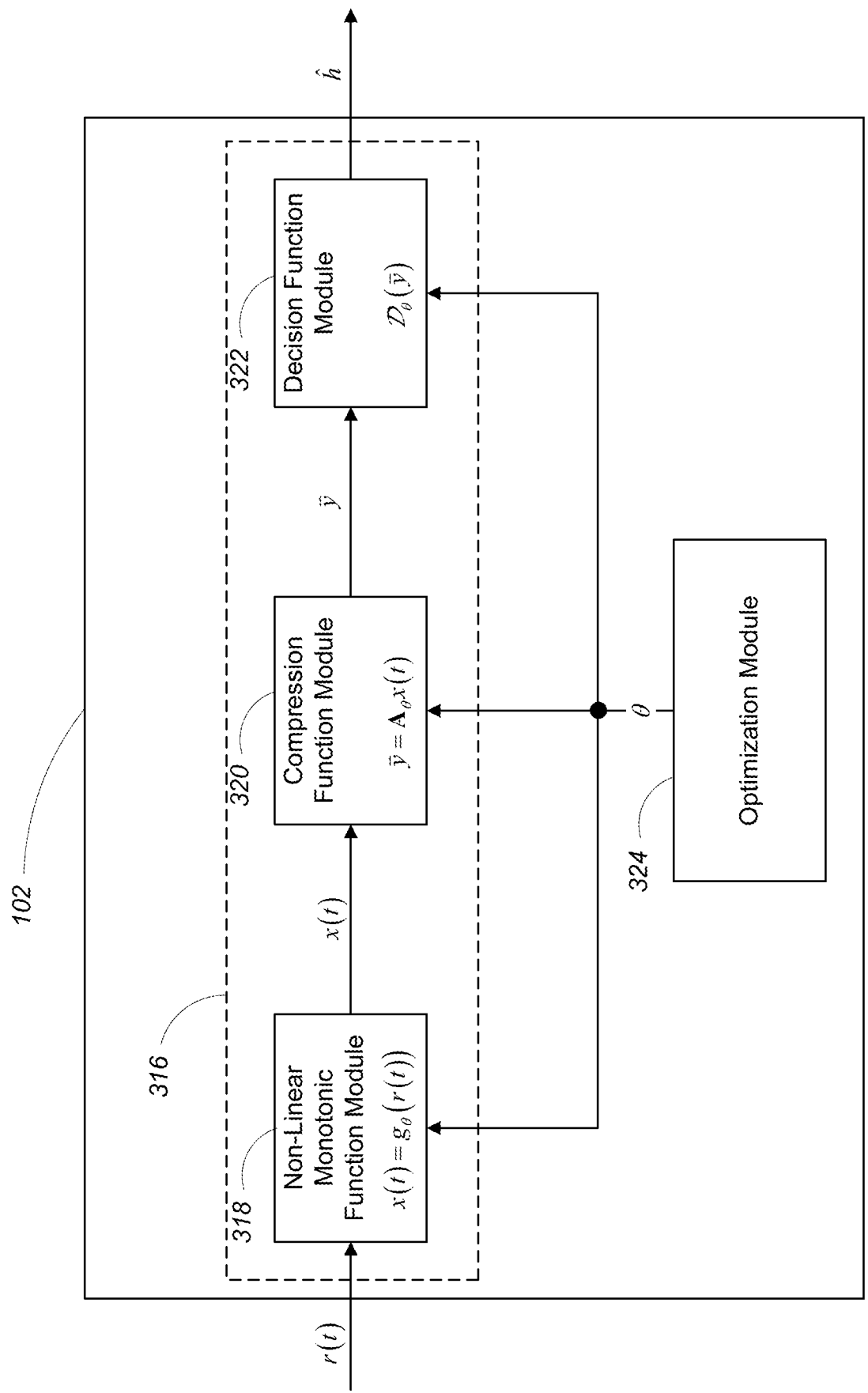
FIG. 3 is a wireless receiver including a time-of-arrival detector.
Figure 4:
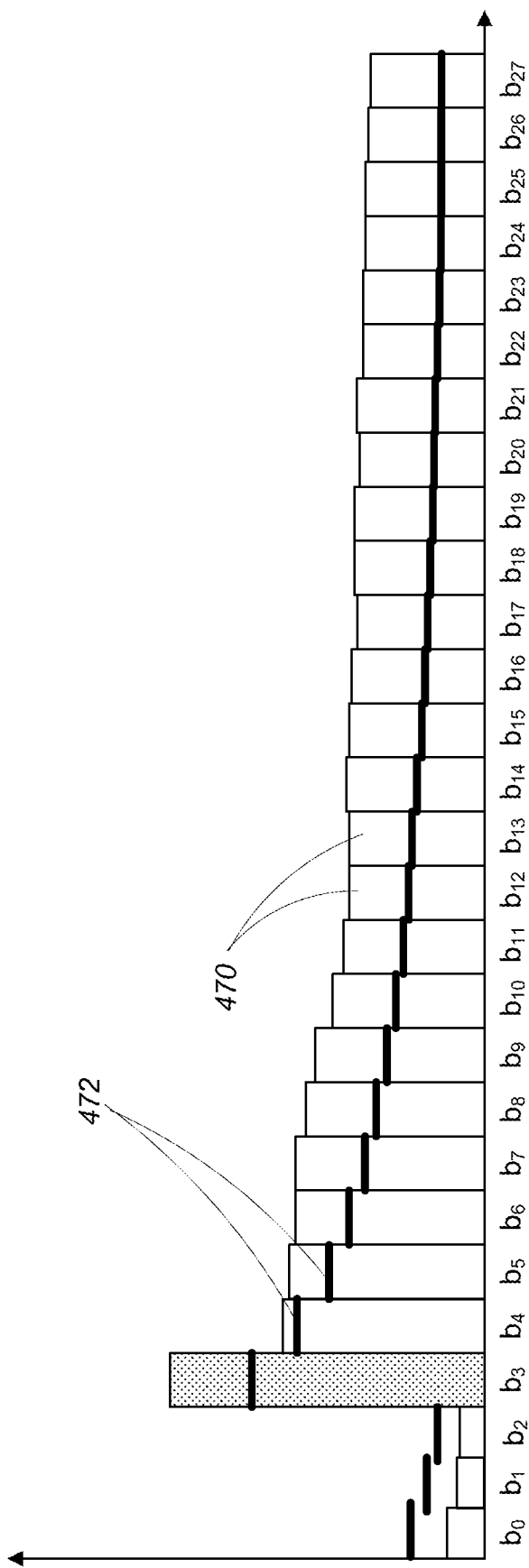
FIG. 4 is a compressed signal including a number of bins, each with a threshold.

Referring to FIGS. 3 and 4, the wireless receiver 102 includes a time-of-arrival (TOA) detector 316, which receives the received signal, r(t) as input and processes r(t) to generate the estimate of the time of arrival $\hat{h}$ of the direct path 108.

The TOA detector 316 includes a non-linear monotonic function module 318, a linear compression function module 320, and a decision function module 322. In operation, the received signal r(t) is provided to the non-linear monotonic function module 318, which applies a non-linear monotonic function, $g_\theta(\cdot)$ to the received signal, r(t) to generate a transformed signal, x(t). In some examples, the non-linear monotonic function is a parameterized power function such as:

$$x(t) = g_\theta(r(t)) = r(t)^\alpha$$

The transformed signal x(t) is provided to the linear compression function module 320, which applies a linear compression function, $A_\theta$ to the transformed signal, x(t) to generate a compressed version of the transformed signal, $\bar{y}$. In some examples, the linear compression function, $A_\theta$ is an m×n matrix which causes linear compression of the transformed signal, x(t) into a number, N, of bins, each representing an aggregation (referred to as the 'level' of the bin) associated with a particular time window in the transformed signal, x(t). In some examples, the bins of the compressed version of the transformed signal, $\bar{y}$ are referred to by index, with bin 0 representing an earliest time window and bin N−1 representing a latest time window.

In some examples, the linear compression function, $A_\theta$ is parameterized such that aspects of the linear compression function (e.g., the duration of the time windows or the weighting of elements in the matrix) can be optimized.

In FIG. 4, one example of a compressed version of the transformed signal, $\bar{y}$ includes a number of bins 470 labeled $b_0$-$b_{27}$.

The compressed version of the transformed signal, $\bar{y}$ is provided to the decision function module 322 which applies a decision function, $\mathcal{D}_\theta(\cdot)$ to the compressed version of the transformed signal, $\bar{y}$, to determine which bin of the compressed version of the transformed signal, $\bar{y}$ includes the arrival of the signal transmitted by the wireless transmitter 100 via the direct path 108. In some examples, the decision function $\mathcal{D}_\theta(\cdot)$ includes a number of threshold values, each threshold value corresponding to a different one of the bins in the compressed version of the transformed signal, $\bar{y}$. In one simple example, the earliest bin of the compressed version of the transformed signal, $\bar{y}$, in which the bin level exceeds the bin threshold is chosen as the bin that includes the arrival of the signal transmitted by the wireless transmitter 100 via the direct path 108. In general, $\mathcal{D}_\theta(\cdot)$ is a decision rule that involves a comparison among elements of $\bar{y}$ or between elements of $\bar{y}$ and a threshold.

In FIG. 4, each bin 470 is associated with a threshold 472 and bin $b_3$ is identified as the first bin in which the bin level exceeds the bin threshold. Bin $b_3$ is therefore chosen as the bin that includes the arrival of the signal transmitted by the wireless transmitter 100 via the direct path 108.

In some examples, the decision function, $\mathcal{D}_\theta(\cdot)$ is parameterized such that aspects of the decision function, $\mathcal{D}_\theta(\cdot)$ (e.g., the various bin thresholds) can be optimized.

An estimated time-of-arrival, $\hat{h}$ associated with the bin chosen by the decision function module 322 is output from the TOA detector 316. The estimated time-of-arrival, combined with knowledge of when the signal was transmitted by the wireless transmitter 100, can be used to determine a distance between the wireless transmitter 100 and the wireless receiver 102.

The wireless receiver 102 also includes an optimization module 324, which updates parameters, θ used by the non-linear monotonic function module 318, the linear compression function module 320, and the decision function module 322 based on the environment 104 in which the wireless receiver 102 operates. In some examples, the optimization module 324 determines the parameters, θ and configures the modules of the TOA detector 316 prior to operating the TOA detector 316. In some examples, the optimization module 324 periodically determines the parameters, θ and configures the modules of the TOA detector 316 during operation of the TOA detector 316 to account for changes in the environment 104.

Figure 5:
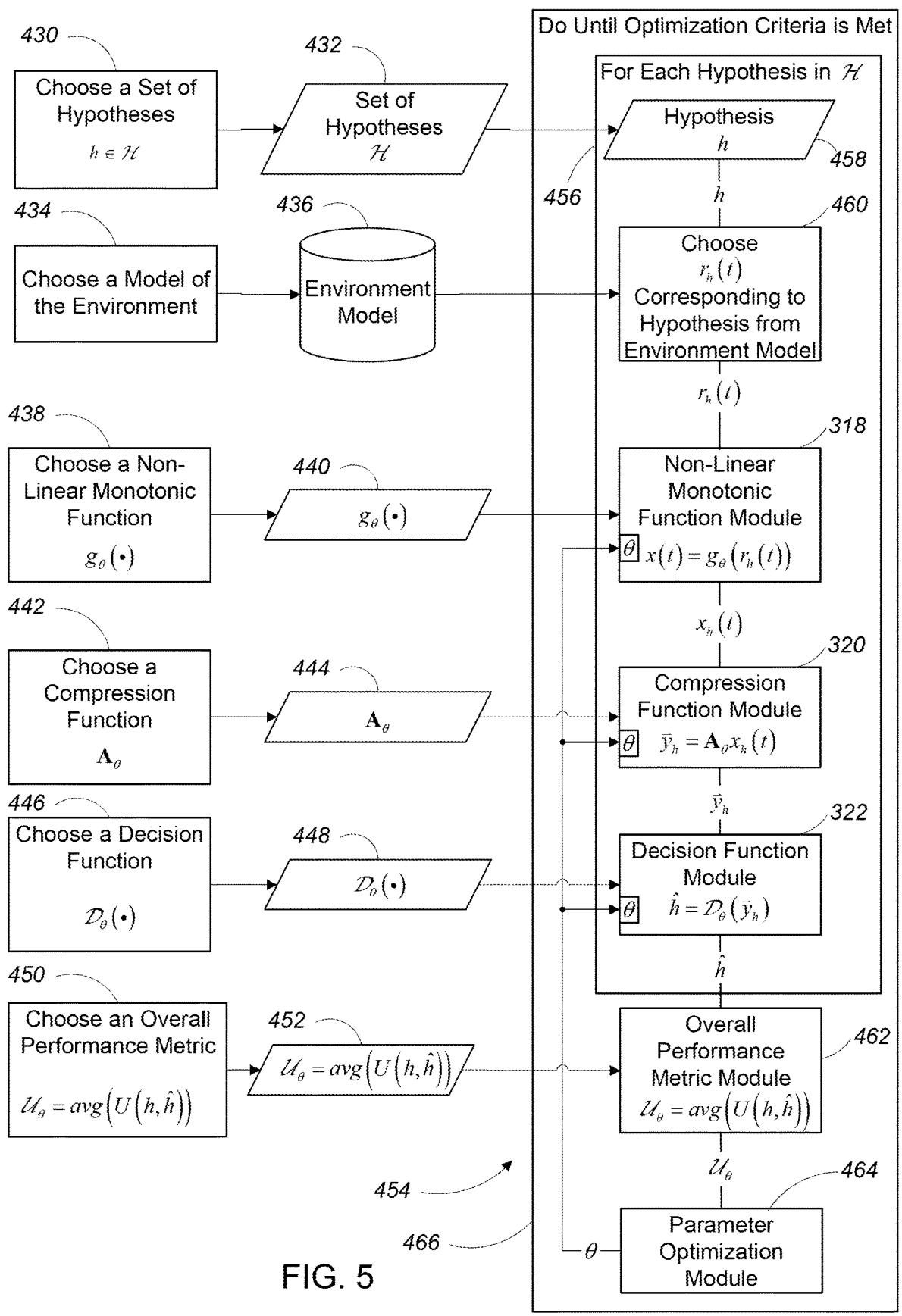
FIG. 5 is a configuration procedure for the time-of-arrival detector.
Figure 6:
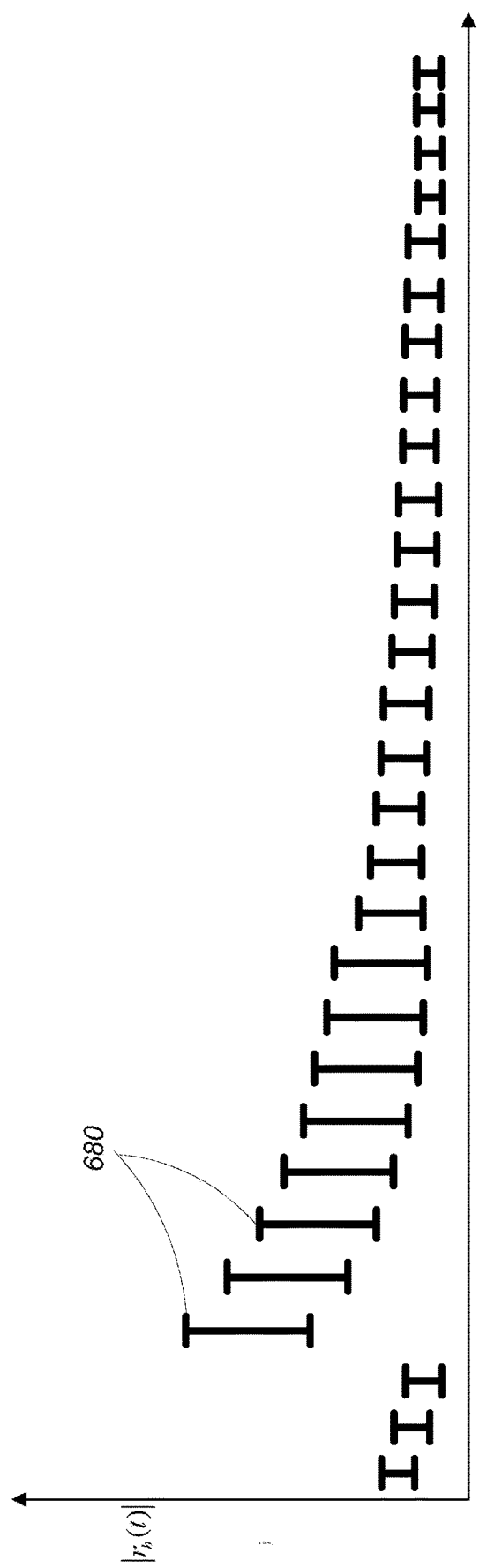
FIG. 6 is an expected received signal distribution for a hypothesis.

Referring to FIGS. 5 and 6, a first step 430 in determining the parameters, θ includes choosing a set of hypotheses, h∈$\mathcal{H}$ 432. In some examples, the set of hypotheses 432 include a range of possible times of arrival (or their corresponding distances) of the signal transmitted by the wireless transmitter 100 via the direct path 108. In a second step 434, a model of the environment 436 in which the wireless receiver 102 is operating is chosen. In some examples, the model of the environment 436 is sufficient for determining an expected received signal, $r_h(t)$ for any hypothesis h in $\mathcal{H}$. In some examples, the model of the environment 436 is sufficient for determining an expected distribution of the received signal and, from such a distribution, a set of different realizations for the received signal, $r_h(t)$ for any hypothesis h in $\mathcal{H}$, is determined. In some examples, the model 436 is a predetermined empirical model for an environment similar to the environment in which the wireless receiver 102 operates. In some examples, the model 436 is an empirical model determined for the environment in which the wireless receiver 102 operates. In some examples, the model 436 is theoretical model.

In a third step 438, the non-linear monotonic function, $g_\theta(\cdot)$ 440 is chosen. As is noted above, in some examples the non-linear monotonic function is a parameterized power function such as:

$$g_\theta(r(t)) = r(t)^\alpha$$

where the value of α is determined in an optimization procedure (described below).

In a fourth step 442, the liner compression function, $A_\theta$ 444 is chosen as an M×N matrix for compressing a signal into a number, N of bins, each bin associated with a value representing a level associated with a particular time window in the signal. In some examples, parameters of the linear compression function 444 include the number of bins, N (or alternatively the size of the individual bins) and weighting values $w_{0,0} \ldots w_{M-1,N-1}$ for weighting the elements of $A_\theta$. The values of N and $w_{0,0} \ldots w_{M-1,N-1}$ are determined in an optimization procedure (described below).

In a fifth step, 446, the decision function, $\mathcal{D}_\theta(\bullet)$ 448 is chosen. As is noted above, in one example, the decision function 448 is chosen such that the earliest bin of the compressed version of the transformed signal, $\bar{y}$ in which the bin level exceeds the bin threshold is chosen as the bin that includes the arrival of the signal transmitted by the wireless transmitter 100 via the direct path 108. In such an example, the parameters of the decision function 448 include the thresholds of the individual bins, $\xi_0 \ldots \xi_{N-1}$. The values of $\xi_0 \ldots \xi_{N-1}$ are determined in an optimization procedure (described below).

It is noted that many other types of decision functions are possible, including: (1) single threshold decision functions, where the bins are compared with a single threshold $\xi$; (2) maximum search decision functions, where the bin with maximum value is picked; and (3) hybrid functions, where a combination of threshold comparison and maximum search is used.

In a fifth step 450, the overall performance metric, $\mathcal{U}_\theta$ 452 is chosen. In general, the overall performance metric 452 is used to evaluate how well the modules of the TOA detector perform over the set of hypotheses 432 when configured according to a given set of parameter values, $\theta$. In some examples, the overall performance function is defined as:

$$\mathcal{U}_\theta = \mathrm{avg}(U(h,\hat{h}))$$

where $U(h,\hat{h})$ represents a performance metric for a given hypothesis, h and the output of the decision function module (configured according to the given set of parameter values, $\theta$), $\hat{h}$ for the given hypothesis, h, and the average operator is applied when a set of different realizations of $r_h(t)$ for any hypothesis h in $\mathcal{H}$, is drawn from the distribution function for r(t) given by the environment model. In one simple example, the performance metric for a given hypothesis, $U(h,\hat{h})$ is defined as the range error, which is the magnitude of a difference between the hypothesis, h and the output of the decision function module, $\hat{h}$. Other performance functions such as range error outage are also used. The range error outage is defined as the probability that the value of $U(h,\hat{h})$ overcomes a target value.

After performing the first through fifth steps, an optimization procedure 454 commences in which the parameter values, $\theta$ are optimized over the set of hypotheses, $\mathcal{H}$ 432 for the chosen environment model 436.

Various ways of optimizing the parameter values, $\theta$ may be used. In an iterative approach, an inner loop 456 of the optimization procedure 454 iterates through each hypothesis, h in the set of hypotheses $\mathcal{H}$ 432. For a given iteration of the inner loop 456, the hypothesis, h 458 and the environment model 436 are provided to a first module 460 which determines an expected received signal or a set of realizations drawn from the distribution of a received signal, $r_h(t)$ for the hypothesis, h according to the environment model 436. In FIG. 6, one example of an expected distribution of a received signal, $r_h(t)$ for the hypothesis, h includes a number of ranges 680 wherein signal samples are expected to fall, each range being associated with a different time in the signal.

In some examples, a collection of the distribution of system outputs can be done iteratively, not only for different values of h in $\mathcal{H}$, but also with respect to different realizations of the environment (for example, another inner loop where $r_h(t)$ is collected at different times). In some examples, the optimization procedure 454 utilizes another module (not shown) which receives $r_h(t)$ and generates f(r) as distribution of values of $r_h(t)$ from the minimum to the maximum values obtained. The optimization is then performed using f(r).

Referring again to FIG. 3, the expected received signal or the set of realizations drawn from the distribution of a received signal, $r_h(t)$ for the hypothesis, h is provided to the non-linear monotonic function module 318, which is configured according to the non-linear monotonic function, $g_\theta(\bullet)$ 440 and a first set of parameter values, $\theta$. The non-linear monotonic function module 318 processes $r_h(t)$ to generate a transformed signal or a set of transformed signals, $x_h(t)$ for the hypothesis, h.

The transformed signal or the set of transformed signals, $x_h(t)$ for the hypothesis, h is provided to the linear compression function module 320, which is configured according to the linear compression function, $A_\theta$ 444 and the first set of parameter values, $\theta$. The linear compression function module 320 processes the transformed signal, $x_h(t)$ to generate a compressed version of the transformed signal or a set of compressed versions, $\bar{y}_h$ for the hypothesis, h.

The compressed version of the transformed signal or a set of compressed versions, $\bar{y}_h$ for the hypothesis is provided to the decision function module 322, which is configured according to the decision function, $\mathcal{D}_\theta(\bullet)$ 448 and the first set of parameter values, $\theta$. The decision function module 322 processes the compressed version of the transformed signal or the set of compressed versions, $\bar{y}_h$ to generate an estimated time-of-arrival or a set of estimates, $\hat{h}$.

The estimated times-of-arrival or a set of estimates, $\hat{h}$ generated for the set of hypotheses $\mathcal{H}$ 432 with the inner loop 456 of the optimization procedure, configured according to the first set of parameter values, $\theta$, are provided to an overall performance metric module 462. The overall performance metric module 462 is configured according to the overall performance metric 452 and processes the estimated times-of-arrival, $\hat{h}$ to generate an overall performance metric value, $\mathcal{U}_\theta$ for the first set of parameter values, $\theta$.

The overall performance metric value, $\mathcal{U}_\theta$ for the first set of parameter values, $\theta$ is provided to a parameter optimization module 464 which updates the first set of parameter values, $\theta$ according to the overall performance metric value, $\mathcal{U}_\theta$ to generate a second set of parameter values, $\theta$.

The above-described procedure is repeated in an outer loop 466 of the optimization procedure 454 until a set of parameter values, $\theta$ meets an optimization criteria.

While the above description relates an application of the methodology and system to a particular problem (i.e., wideband ranging), it is noted that the methodology and system are also applicable to other problems such as image processing (e.g., for vehicle detection) and spectrum sensing for cognitive radio, both of which are described in greater detail the attached appendices.

It is to be understood that the foregoing description is intended to illustrate and not to limit the scope of the invention, which is defined by the scope of the appended claims. Other embodiments are within the scope of the following claims.

What is claimed is:

1. A ranging system comprising:
an input for receiving a wireless signal;
a detector for determining an estimate of a time-of-arrival of the wireless signal at the ranging system, the detector including:
a first module for processing the wireless signal according to a non-linear, monotonic transformation to generate a modified signal;
a second module for compressing the modified signal according to a linear transformation, resulting in a compressed signal including a plurality of elements, each element corresponding to a different time segment of the modified signal; and
a third module for applying a decision function for determining an output including a first element of the plurality of elements, corresponding to the time-of-arrival of the wireless signal at the ranging system, applying the decision function, including comparing the elements of the compressed signal to corresponding thresholds of a plurality of thresholds associated with the plurality of elements.

2. The ranging system of claim 1 wherein the first module, the second module, and the third module are configured to operate according to a set of parameters.

3. The ranging system of claim 2 wherein the non-linear, monotonic transformation includes a power function and the set of parameters includes a first parameter associated with an exponent of the power function.

4. The ranging system of claim 2 wherein the linear transformation is associated with an M×N element compression matrix, where N is a number of elements in the compressed signal.

5. The ranging system of claim 4 wherein the set of parameters includes a parameter associated with N.

6. The ranging system of claim 4 wherein the set of parameters includes a plurality of weighting parameters, each weighting parameter associated with an element of the M×N element compression matrix.

7. The ranging system of claim 2 wherein the set of parameters includes a plurality of threshold parameters, each threshold parameter associated with a corresponding threshold of the plurality of thresholds.

8. The ranging system of claim 2 further comprising a fourth module for determining the set of parameters including:
for each hypothesis of a plurality of hypotheses,
determining a hypothesized input signal for the hypothesis according to an environment model,
processing the hypothesized input signal using the first module configured according to the set of parameters, the second module configured according to the set of parameters, and the third module configured according to the set of parameters to determine the output of the ranging system for the hypothesis, and
determining an overall performance metric for the ranging system, configured according to the set of parameters, based on the plurality of hypotheses and the outputs of the ranging system corresponding to the plurality of hypotheses, and
updating the set of parameters based on the performance metric.

9. The ranging system of claim 8 wherein each hypothesis of the plurality of hypotheses corresponds to a possible time-of-arrival of the wireless signal at the ranging system.

10. The ranging system of claim 8 wherein the environment model includes a predetermined mapping between a plurality of hypotheses and a corresponding plurality of hypothesized input signals in an environment similar to an environment in which the ranging system operates.

11. The ranging system of claim 8 wherein the set of parameters are determined iteratively.

12. The ranging system of claim 8 wherein determining the performance metric includes averaging a plurality of local performance metrics, each local performance metric determined from a hypothesis of the plurality of hypothesis and its corresponding ranging system output.

13. The ranging system of claim 12 wherein the local performance metric is based on a range error between the hypothesis and its corresponding ranging system output.

14. The ranging system of claim 1 wherein applying the decision function further includes identifying an element with a maximum value from the plurality of elements of the compressed signal.

15. The ranging system of claim 1 wherein the non-linear, monotonic transformation includes a non-linear, non-square law monotonic transformation.

16. The ranging system of claim 1 wherein comparing the elements of the compressed signal to corresponding thresholds of the plurality of thresholds associated with the plurality of elements includes identifying an earliest element of the plurality of elements of the compressed signal that exceeds the threshold corresponding to the element.

17. A method for configuring a ranging system comprising:
choosing a set of hypotheses, each hypothesis of the plurality of hypotheses being associated with a different time-of-arrival of a wireless signal at the ranging system;
choosing a model of the environment in which the ranging system is deployed;
configuring the ranging system according to a non-linear monotonic transformation, the non-linear monotonic function being parameterized by a first set of one or more parameters;
configuring the ranging system according to a linear compression function, the linear compression function being parameterized by a second set of one or more parameters;
configuring the ranging system according to a decision function, the decision function being parameterized by a third set of one or more parameters;
updating the first set of one or more parameters, the second set of one or more parameters, and the third set of one or more parameters according to a metric associated with an estimated performance of the ranging system in the environment, over the set of hypotheses, when configured according to the first set of one or more parameters, the second set of one or more parameters, and the third set of one or more parameters.

18. The method of claim 17 wherein the non-linear, monotonic transformation includes a non-linear, non-square law monotonic transformation.

19. The method of claim 17 wherein the non-linear, monotonic transformation includes a power function and the set of parameters includes a first parameter associated with an exponent of the power function.

20. The method of claim 17 wherein the linear transformation includes an M×N element compression matrix, where N is a number of elements in a compressed signal output by the linear compression function, and the set of parameters includes a parameter associated with N and a plurality of weighting parameters, each weighting parameter associated with an element of the M×N element compression matrix.

21. The method of claim 20 wherein the decision function is configured to apply a plurality of thresholds to elements of the compressed signal and the set of parameters includes a plurality of threshold parameters, each threshold parameter associated with a corresponding threshold of the plurality of thresholds.

22. The method of claim 20 wherein the non-linear, monotonic function includes a power function and the first set of one or more parameters includes a first parameter associated with an exponent of the power function.

23. The method of claim 22 wherein the linear compression function is associated with an M×N element compression matrix, where N is a number of elements in the compressed signal.

24. The method of claim 23 wherein the second set of one or more parameters includes a parameter associated with N.

25. The method of claim 23 wherein the second set of one or more parameters includes a plurality of weighting parameters, each weighting parameter associated with an element of the M×N element compression matrix.

26. The method of claim 20 wherein configuring the ranging system according to the decision function further includes identifying an element with a maximum value from the plurality of elements of the compressed signal.

27. The method of claim 17 further comprising determining a fourth set of one or more parameters including:
for each hypothesis of a plurality of hypotheses,
determining a hypothesized input signal for the hypothesis according to an environment model,
a first module configured according to processing the hypothesized input signal according to the first set of one or more parameters, a second module configured according to the second set of one or more parameters, and a third module configured according to the third set of one or more parameters to determine the output of the ranging system for the hypothesis, and
determining an overall performance metric for the ranging system, configured according to the fourth set of one or more parameters, based on the plurality of hypotheses and the outputs of the ranging system corresponding to the plurality of hypotheses, and
updating the set of parameters based on the performance metric.

28. The method of claim 27 wherein each hypothesis of the plurality of hypotheses corresponds to a possible time-of-arrival of the wireless signal at the ranging system.

29. The method of claim 27 wherein the environment model includes a predetermined mapping between a plurality of hypotheses and a corresponding plurality of hypothesized input signals in an environment similar to an environment in which the ranging system operates.

30. The method of claim 27 wherein the fourth set of one or more parameters are determined iteratively.

31. The method of claim 27 wherein determining the performance metric includes averaging a plurality of local performance metrics, each local performance metric determined from a hypothesis of the plurality of hypothesis and its corresponding ranging system output.

32. The method of claim 31 wherein the local performance metric is based on a range error between the hypothesis and its corresponding ranging system output.

33. The method of claim 17 wherein the non-linear, monotonic transformation includes a non-linear, non-square law monotonic transformation.

* * * * *